United States Patent [19]
Forchini et al.

[11] 3,875,269
[45] Apr. 1, 1975

[54] COOLING TOWER DISTRIBUTION BOX

[75] Inventors: James F. Forchini, Healdsburg; Mark A. Machado, Santa Rosa, both of Calif.

[73] Assignee: Ecodyne Corporation, Lincolnshire, Ill.

[22] Filed: Jan. 18, 1973

[21] Appl. No.: 323,487

[52] U.S. Cl. .................... 261/111, 261/DIG. 11
[51] Int. Cl. ............................................ B01f 3/04
[58] Field of Search ...... 261/111, 97, DIG. 11, 110, 261/66, 98; 239/548, 562

[56] References Cited
UNITED STATES PATENTS

| | | | |
|---|---|---|---|
| 1,502,573 | 7/1924 | Kuhn | 261/DIG. 11 |
| 2,428,922 | 10/1947 | Shoresman | 261/97 X |
| 2,639,947 | 5/1953 | Tramm et al. | 261/111 X |
| 2,771,281 | 11/1956 | Otto | 261/111 X |
| 3,268,217 | 8/1966 | Goitein | 261/110 |
| 3,352,546 | 11/1967 | Greenfield | 261/111 |
| 3,353,802 | 11/1967 | Greer | 261/DIG. 11 |
| 3,395,900 | 8/1968 | Meek | 261/DIG. 11 |
| 3,739,556 | 6/1973 | Waters | 261/DIG. 11 |
| 3,784,171 | 1/1974 | Engalitcheff, Jr. et al. | 261/DIG. 11 |

OTHER PUBLICATIONS
Support Plates and Distributors for Packed Towers, The U.S. Stoneware Co., Bulletin TA-30, page 21, copyright 1957.

Primary Examiner—Frank W. Lutter
Assistant Examiner—Richard L. Chiesa
Attorney, Agent, or Firm—Joel E. Siegel; Charles M. Kaplan

[57] ABSTRACT

A cooling tower distribution box which includes a cover shroud to direct the discharge from the flow control valve down upon a distribution pan mounted directly below. The distribution pan includes a cone, ribs, and baffles molded integrally therein. The cone causes a 360° distribution of the water from cover shroud to the integral ribs. The ribs project radially outward from the cone to effect a uniform distribution over the pan. The baffles balance the flow of water to offset the kinetic energy of initial water velocity. Cutouts are provided in the pan in alignment with the nozzles in the basin floor permitting the passage of water therethrough. The shroud and pan are both molded from a plastic material and thereby offer exceptional corrosion resistance.

15 Claims, 4 Drawing Figures

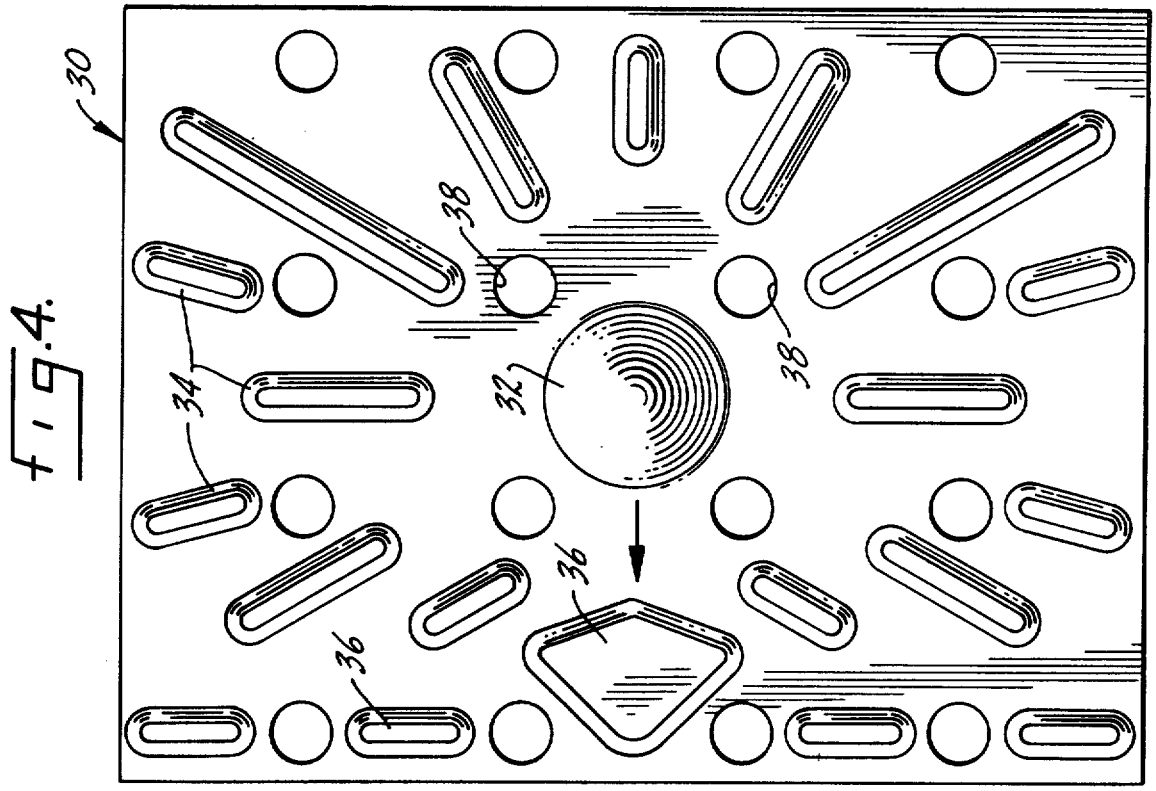
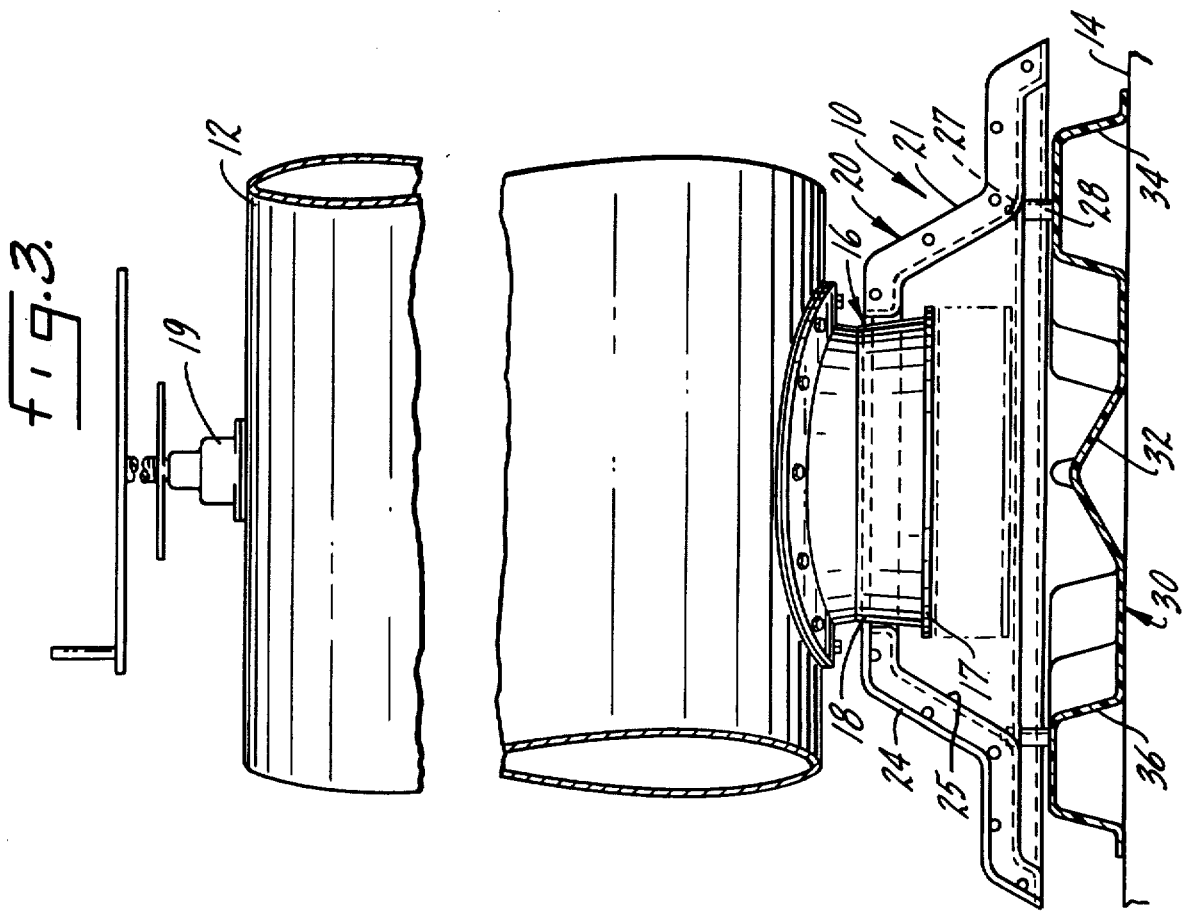

COOLING TOWER DISTRIBUTION BOX

BACKGROUND AND SUMMARY OF THE INVENTION

This invention relates to a distribution box for directing the discharge of water from a cooling tower manifold pipe into a cooling tower hot water basin.

Water to be cooled in a cooling tower is directed through a horizontal manifold pipe supported above the hot water basin. Right angle flow control poppet valves are selectively positioned along the manifold pipe to receive the discharge from the manifold and direct it to distribution boxes associated therewith, positioned immediately above the hot water basin. The purpose of the distribution boxes are to distribute the water uniformly and evenly over a horizontal plane of discharge nozzles located in the cooling tower hot water basin. The discharge nozzles distribute the hot water evenly over the fill area in cooling relationship to fill material positioned therein.

The heretofore used conventional distribution boxes have included a honeycomb type wood structure to receive the splashing water and distribute it under its outer edges across the hot water basin. These boxes have tended to be very large and have many parts which are time consuming to erect. A large pressure drop also is present across these boxes which causes pumping and distribution problems. Being constructed of wood these boxes do not offer good resistance to corrosion and, therefore, require frequent maintenance.

It is a primary object of the present invention to provide a cooling tower distribution box that more uniformly distributes the water and occupies a smaller area than heretofore known boxes.

Another object is to provide a cooling tower distribution box which is constructed from a few parts and therefore, is easy to erect.

A further object of the present invention is to provide a cooling tower distribution box which reduces the pressure drop thereacross.

A still further object is to provide a cooling tower distribution box which is constructed from plastic parts and thereby offers resistance to corrosion.

The distribution box of the present invention includes a cover shroud, which is received around the manifold valve body, to direct the discharge from the flow control valve down upon a distribution pan mounted directly below. The distribution pan includes a cone, ribs and baffles molded integrally therein. The cone causes a 360° distribution of water from the cover shroud discharge to the integral ribs. The ribs project radially outward from the cone to effect the uniform distribution over the pan. The baffles balance the flow of water to offset the kinetic energy of initial water velocity. Cut-outs are provided in the pan in alignment with the nozzles in the basin floor permitting the passage of water therethrough. The shroud and pan are both molded from a plastic material and thereby offer exceptional corrosion resistance.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like references numerals designate like parts throughout the figures thereof and wherein:

FIG. 3 is a sectional view taken along line 3—3 in FIG. 1; and

FIG. 4 is a top plan view of the distribution pan partially shown in FIG. 1.

DESCRIPTION OF A PREFERRED EMBODIMENT

Figure 2:
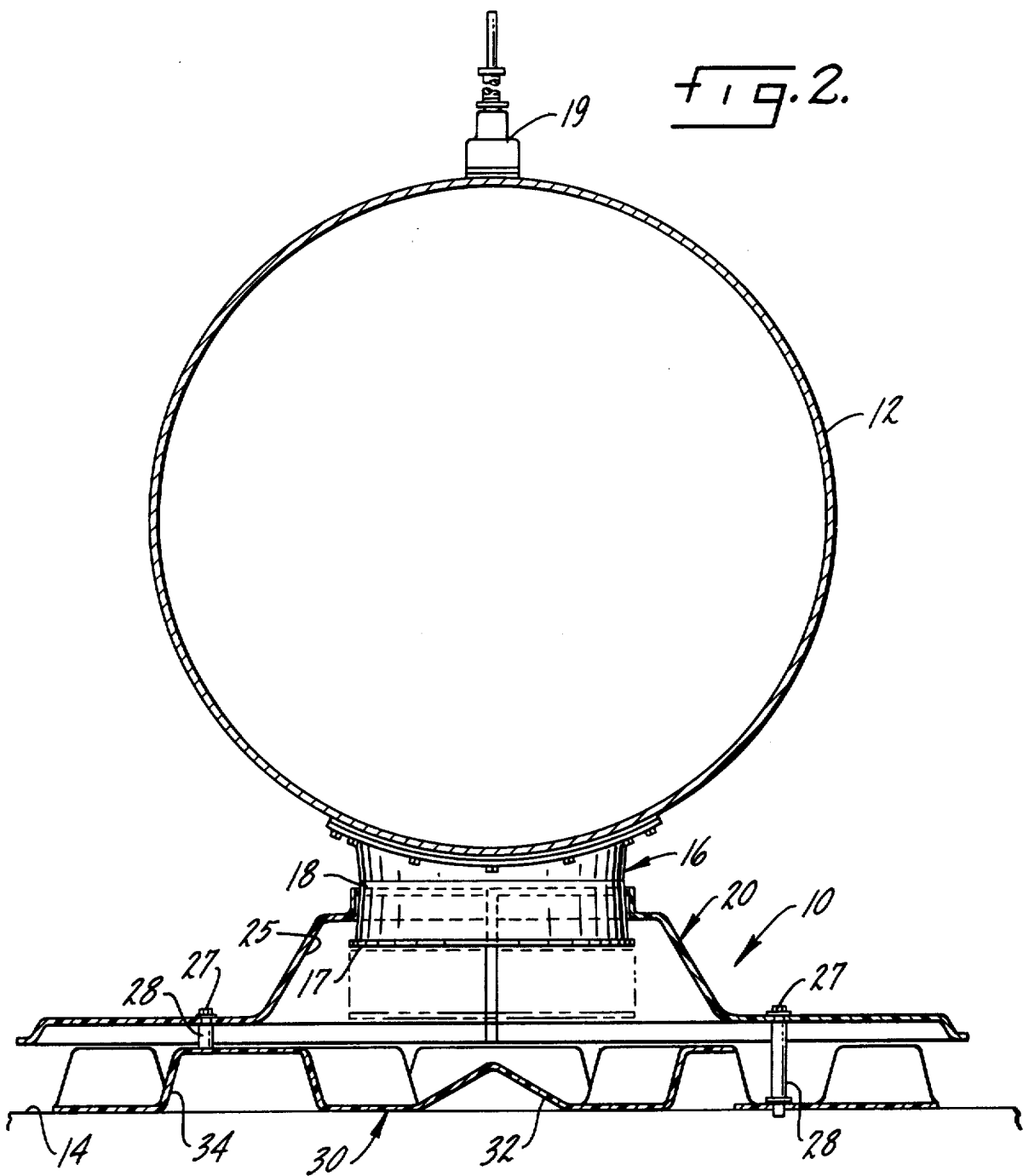
FIG. 2 is a sectional view taken along line 2—2 in FIG. 1.

Referring to FIGS. 2 and 3, the distribution box of the present invention is indicated generally at 10. Distribution box 10 is shown secured to a cooling tower inlet manifold 12 and the top of the hot water basin floor indicated at 14. Manifold 12 is provided with a conventional right angle poppet type flow control valve 16 having a sealing disk 17, a valve body 18 and a control mechanism 19. Control mechanism 19 is effective to vertically move sealing disk 17 between a closed position, indicated by solid lines in FIGS. 2 and 3, and an open position, indicated by phantom lines in FIGS. 2 and 3, wherein disk 17 is spaced from body 18. Valve 16 effectively controls the passage of hot water from manifold 12 to distribution box 10.

Distribution box 10 generally includes a two piece cover shroud 20 which bolts and seals directly to valve body 18. A distribution pan 30 is mounted directly beneath shroud 20 in vertical alignment with the center line of valve 16. Pan 30 includes cone 32, ribs 34, and baffles 36 molded integral therewith having specific shape and being at specific locations to effect uniform water distribution over pan 30. Also provided in pan 30 are cut-outs 38 in vertical alignment with the spray nozzles (not shown) located in the hot water basin directly beneath pan 30. Shroud 20 is preferably molded from a plastic material such as chopped strand fiberglass. Pan 30 is preferably molded from a plastic material such as rigid vinyl sheets.

Figure 1:
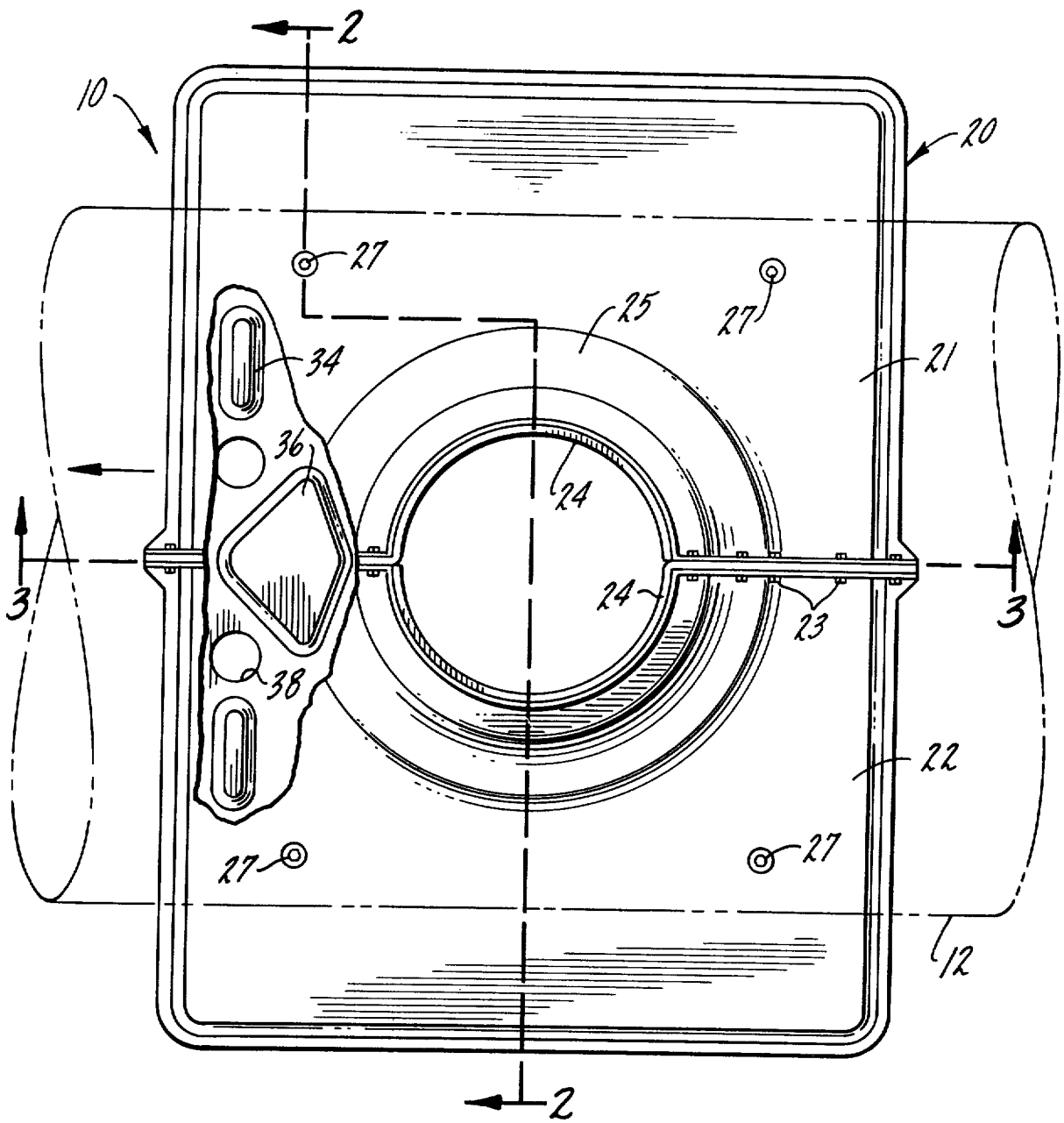
FIG. 1 is a top plan view of the distribution box of the present invention, partially broken away to show the distribution pan, in combination with a manifold shown in phantom lines.

Referring to FIGS. 1–3 cover shroud 20 includes a pair of shroud sections 21 and 22 which are formed to fit around valve body 18. Sections 21 and 22 are secured together by bolts 23 with sealing material 24 positioned therebetween and between the shroud 20 and body 18, as best seen in FIGS. 1 and 2. The purpose of cover shroud 20 is to direct the discharge of water from valve 16 down upon distribution pan 30. Shroud 20 is formed with a conically diverging section 25 molded integral therewith, as best seen in FIG. 2, to facilitate the discharge of water from shroud 20 to pan 30.

As seen in FIGS. 1-2, distribution pan 30 is mounted directly below cover shroud 20 in alignment with the center line of valve 16 by bolts 27. Spacers 28 are provided around bolts 27 to space and support shroud 20 above pan 30. Bolts 27 are preferably received by well-nuts (not shown) positioned in the hot water basin floor. This support arrangement permits a person to stand on cover shroud 20 for adjustment and inspection of valve 16.

Distribution pan 30 is of rectangular shape with an integrally molded cone 32, ribs 34, and baffles 36 formed therein, as best seen in FIG. 4. Cone 32 is positioned below and in alignment with valve body 18 and provides a 360° distribution of water from the cover shroud discharge to the integral ribs 34. Ribs 34 are oriented generally radially outward and project from cone 34 to effect a uniform distribution of water over the entire pan 30. The baffles 36 are provided to balance the flow of water to offset the kinetic energy of initial water velocity through manifold 12. The direction of initial water velocity is indicated by an arrow in FIGS. 1 and 4. Cut-outs 38 are provided in pan 30 in vertical alignment with the nozzles in the floor of the hot water basin therebelow to permit the passage of water therethrough.

In operation, water to be cooled is directed through manifold 12 in the direction as indicated by the arrow in FIG. 1. With valve 16 in its open position, as shown in phantom lines in FIGS. 2 and 3, the water is directed through the opening between body 18 and sealing disk 17 into cover shroud 20. Diverging section 25 of shroud 20 directs the discharge from valve 16 onto distribution pan 30. Cone 32 provides a 360° distribution of the water from shroud 20 and the ribs 34 effect the uniform distribution thereof over the entire pan 30. Baffles 36 balance the flow of water to offset the kinetic energy of the initial water velocity to ensure the uniform distribution of the water.

Distribution box 10 constructed in accordance with the present invention offers much improved corrosion resistance over conventional wood distribution boxes. Box 10, being constructed from just a few parts, is much lighter, easier to erect, and weighs and costs less than conventional distribution boxes. The water distribution is also improved and the maintenance simplified due to the unique construction of box 10.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A distribution box for receiving water to be cooled from a substantially horizontal cooling tower manifold pipe and uniformly distributing the water over a substantially horizontal hot water basin floor having spray nozzles positioned therethrough, comprising:
   a. a covering shroud having an opening in fluid communication with and secured immediately below said manifold pipe for receiving water from said manifold pipe; and
   b. a distribution pan positioned immediately below and covered by said covering shroud having a plurality of flow directing means formed integral therewith for receiving the water directed thereon from said covering shroud and uniformly distributing it in a substantially horizontal direction over said water basin floor.

2. The invention as defined in claim 1 wherein said flow directing means includes a plurality of radially extending rib means which project upward towards said covering shroud.

3. The invention as defined in claim 2 wherein said flow directing means includes cone means projecting upward towards said covering shroud for effecting a 360° distribution of water from said covering shroud to said rib means.

4. The invention as defined in claim 3 wherein said flow directing means includes baffle means projecting upwards towards said covering shroud for balancing the flow of water to offset the kinetic energy of initial water velocity.

5. The invention as defined in claim 4 wherein said covering shroud and said distribution pan are molded from a plastic material.

6. In a cooling tower including a hot water basin for receipt of water to be cooled having spray nozzles positioned in the floor thereof, a manifold pipe positioned above said hot water basin having openings therein with control valve means associated therewith, and a distribution box associated with said control valve means for receiving water to be cooled from said manifold pipe and uniformly distributing it over said hot water basin floor; said distribution box comprising:
   a. a covering shroud having an opening in fluid communication with and secured immediately below said control valve means for receiving water from said manifold pipe; and
   b. a distribution pan positioned immediately below and covered by said covering shroud having a plurality of flow directing means formed integral therewith for receiving the water directed thereon from said covering shroud and uniformly distributing it in a substantially horizontal direction over said water basin floor.

7. The invention as defined in claim 6 wherein said control valve means includes a body portion extending downward from said manifold pipe and the opening in said covering shroud is positioned around said body portion.

8. The invention as defined in claim 7 wherein said covering shroud is of two piece construction secured together around said body portion with sealing material positioned therebetween.

9. The invention as defined in claim 8 wherein said covering shroud has a conical diverging section molded integral therewith to direct the discharge of water from said control valve means upon said distribution pan.

10. The invention as defined in claim 6 wherein said covering shroud is secured to and spaced from said distribution pan by a plurality of bolt means received by spacers positioned therebetween so as to permit an operator to stand on said cover shroud for inspection and adjustment of said control valve means.

11. The invention as defined in claim 10 wherein said bolt means are received by well-nuts positioned in said hot water basin floor.

12. The invention as defined in claim 11 wherein said distribution pan includes a plurality of cut-outs in vertical alignment with said nozzles in said hot water basin floor therebelow so as to permit the passage of water therethrough.

13. The invention as defined in claim 6 wherein said flow directing means includes a cone means, and a plurality of rib means and baffle means projecting upward towards said covering shroud for effecting a uniform distribution of water over said distribution pan.

14. In a cooling tower including a hot water basin for receipt of water to be cooled having spray nozzles positioned in the floor thereof, a manifold pipe positioned above said hot water basin having openings therein with control valve means associated therewith, and a distribution box associated with said control valve means for receiving water to be cooled from said manifold pipe and uniformly distributing it over said hot water basin floor; said distribution box comprising:

a. a plastic covering shroud having an opening in fluid communication with and secured immediately below said control valve means for receiving water from said manifold pipe, said covering shroud being integrally formed with a conically diverging section; and b. a plastic distribution pan positioned immediately below and covered by said covering shroud having a plurality of flow directing means formed integral therewith for receiving the water directed thereon from said covering shroud and uniformly distributing it in a substantially horizontal direction over said water basin floor;

c. said flow directing means includes a cone means, and a plurality of rib means and baffle means projecting upward towards said covering shroud for effecting a uniform distribution of water over said distribution pan.

15. The invention as defined in claim 14 wherein said covering shroud is secured to and spaced from said pan by a plurality of bolt means received by spacers positioned therebetween so as to permit an operator to stand on said cover shroud for inspection and adjustment of said control valve means.

* * * * *